Aug. 17, 1954     R. E. EVANS ET AL     2,686,824
ELECTRIC FURNACE Filed March 6, 1951     7 Sheets-Sheet 1

Fig. 1

INVENTORS
RICHARD E. EVANS
PAUL F. DARBY
THOMAS G. OWEN
BY

ATTORNEYS

Fig. 2

INVENTORS
RICHARD E. EVANS
PAUL F. DARBY
THOMAS G. OWEN
BY
John H. Lewis Jr.
ATTORNEYS

Fig. 6

Aug. 17, 1954   R. E. EVANS ET AL   2,686,824
ELECTRIC FURNACE
Filed March 6, 1951   7 Sheets-Sheet 6

Fig.7

INVENTORS
RICHARD E. EVANS
PAUL F. DARBY
THOMAS G. OWEN
BY
John H. Lewis Jr.
ATTORNEYS Aug. 17, 1954

R. E. EVANS ET AL 2,686,824

ELECTRIC FURNACE

Filed March 6, 1951

INVENTORS
RICHARD E. EVANS
PAUL F. DARBY
THOMAS G. OWEN

BY

ATTORNEYS

Patented Aug. 17, 1954

2,686,824

UNITED STATES PATENT OFFICE 2,686,824

ELECTRIC FURNACE

Richard E. Evans, Southport, and Paul F. Darby and Thomas G. Owen, Fairfield, Conn., assignors, by mesne assignments, to Rem-Cru Titanium, Inc., Midland, Pa., a corporation of Pennsylvania Application March 6, 1951, Serial No. 214,128

22 Claims. (Cl. 13—13)

This invention relates to apparatus for causing an electrode or like device to move in a predetermined pattern. The invention has been illustrated and will be described as applied to a furnace for the melting or melt casting of refractory and/or reactive substances such as titanium metal and alloys thereof. Due to the reactivity of titanium, melting must be performed in a controlled atmosphere and the molten metal must not be permitted to remain in contact with other substances such as crucible walls for an appreciable length of time. For this reason, titanium and titanium base alloy ingots are cast in cold molds. Comminuted metal is fed into the electrically conductive mold and an arc is struck between the metal and an electrode disposed within the mold. As the ingot builds up in the crucible, the electrode is withdrawn at a regulated rate and only a small pool of molten metal exists at any time in the top of an otherwise solid ingot. If the ingot is of a diameter of more than a few inches, it becomes difficult to extend the molten pool in the ingot top close enough to the crucible wall to insure that metal adjacent the cold wall remains fluid for sufficient time to produce continuous and homogeneous ingots.

To facilitate the production of larger diameter ingots, the present invention contemplates moving the electrode in a circular path of somewhat less diameter than the interior diameter of the crucible, thus insuring melting and homogeneity in the peripheral portion of the ingot. However, as the ingot diameter is increased, the distance between the ingot center and an arc moving in a continuously circular path adjacent the crucible wall is increased, with a tendency to leave a cold spot in the center of the ingot, in which the incoming pulverulent metal is not melted into proper homogeneity with the ingot. Accordingly, the invention provides for controlling movement of the electrode in such a manner that at desired intervals it departs from its circular path adjacent the crucible wall and performs an excursion of a desired radial magnitude toward the crucible center. Concurrently with the complex movement of the electrode in a plane adjacent the top of the ingot, the electrode must be withdrawn lengthwise of the ingot as the ingot is built up by the melting of the incoming metal. Means are therefore provided for withdrawing the electrode at an appropriate rate as the ingot in the crucible increases in length.

The invention enables the production of titanium ingots of a length of several feet and a diameter of 15 inches or more. The electrode is carried at the end of a stem of considerable length, which stem is so pivoted as to move in a cone generating path. Suitable means for giving the electrode stem such a cone generating movement are associated with the electrode stem holder or frame. In the present specification and claims, for convenience and brevity, the cone generating movement of the electrode stem will sometimes be described as a "gyratory" movement, notwithstanding the feature of rotation about its own axis, usually associated with this term, is lacking. The diameter of the path of movement of the electrode must remain substantially the same throughout the build-up of a long ingot, and the present invention contemplates such a shifting of the position of the electrode path generating means with respect to the electrode stem pivot as to provide the needed maintenance of constant diameter.

With these and other objects in view, the invention consists in certain novel mechanisms, combinations and arrangements of parts, a representative embodiment of which is illustrated in the drawings, in which.

The apparatus (Fig. 1) comprises a furnace body 10 of cylindrical shape, to the bottom of which is secured the ingot mold or crucible 11. The metal to be melted is introduced into the furnace body by any desired means, not shown since it forms no part of the present invention. The furnace body is closed at the top by a cover 12 having a central aperture around which is secured the lower flange 13 of an elastic metal bellows joint 14. The electrode stem 16, having secured to the lower end thereof the electrode 17, enters the furnace body through the bellows, which bellows is of sufficient inside diameter and flexibility to permit the movement of the electrode stem in the conical path heretofore mentioned. Within and secured to the top flange 18 of the elastic bellows is an electrode stem guide 19 (Fig. 3) through which the electrode stem slides in its vertical movement, a suitable gas-tight joint indicated generally at 20 being provided between the electrode stem 16 and guide 19. It will be understood that the guide 19 is in gas-tight relationship to the bellows flange 18. An electrode stem holder or frame is supported from and in universal pivotal relation to the furnace cover 12 by means of brackets 21 secured to the furnace cover and carrying pivot studs 22 received in apertures in a gimbal ring 23. At 90° to the pivots 22 said gimbal ring 23 is pivoted to brackets 24 secured to a base block 25 which supports other elements of the electrode stem frame and associated driving devices. It will be obvious that the gimbal ring and bracket connection just described enables a universal movement of the electrode stem frame with respect to the furnace cover and that the weight of the electrode stem frame is carried by brackets 21 rather than by the bellows 18, which bellows, with the connections above described, provides a gas-tight entrance of the electrode stem into the furnace body while enabling universal movement of the electrode stem relative to the furnace body. It should further be noted that the fixed center of the gyratory movement of the electrode stem is the center of gimbal ring 23.

Figure 7:
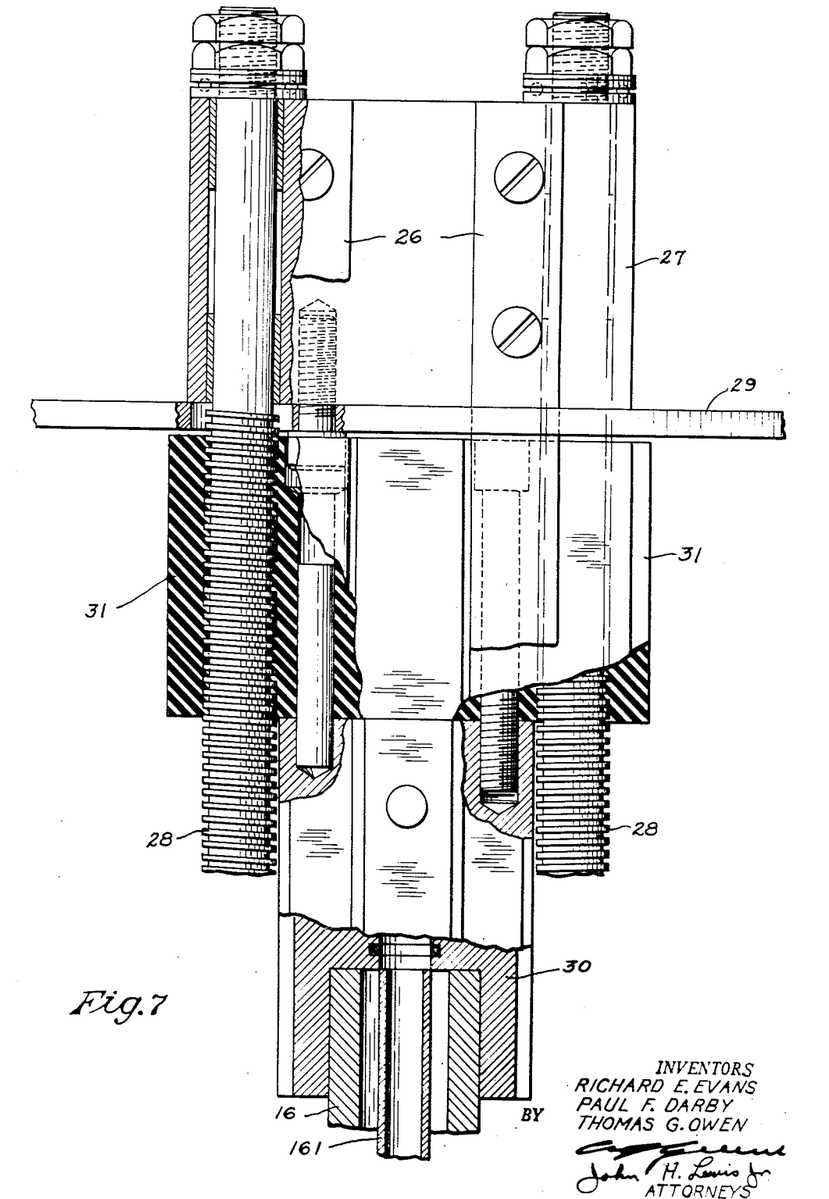
Fig. 7 is a fragmentary elevation, partly in section, of the upper portion of the electrode stem frame and associated parts.

The electrode stem frame comprises one or more (in the present instance four) posts 26 (Fig. 2), secured to and extending upwardly from the base 25. The upper ends of said posts are secured together by means of a top plate 27 (Fig. 7) and the assembly constitutes a support and guide for electrode stem 16 and one or more electrode stem feed screws 28, rotatably mounted in base 25 and supported on thrust bearings on top plate 27. Preferably an insulating disk 29 is secured to the underside of top plate 27. The electrode stem is secured to an electrode head block 30 of conductive metal such as copper, said block, in turn, being secured to an electrode stem feed block 31 of insulating material, said feed block being apertured and threaded to receive the aforementioned feed screws 28. Thus, rotation of the feed screws 28 will move the electrode stem longitudinally within the electrode stem frame, raising or lowering the electrode. Suitable electric current and water connections (not shown) are associated with head block 30. Electrode stem 16 is a tubular member which contains in spaced relation a smaller tubular member 161, also secured to head block 30. Cooling water is circulated through tube 161 and the space between 161 and 16.

Figure 1:
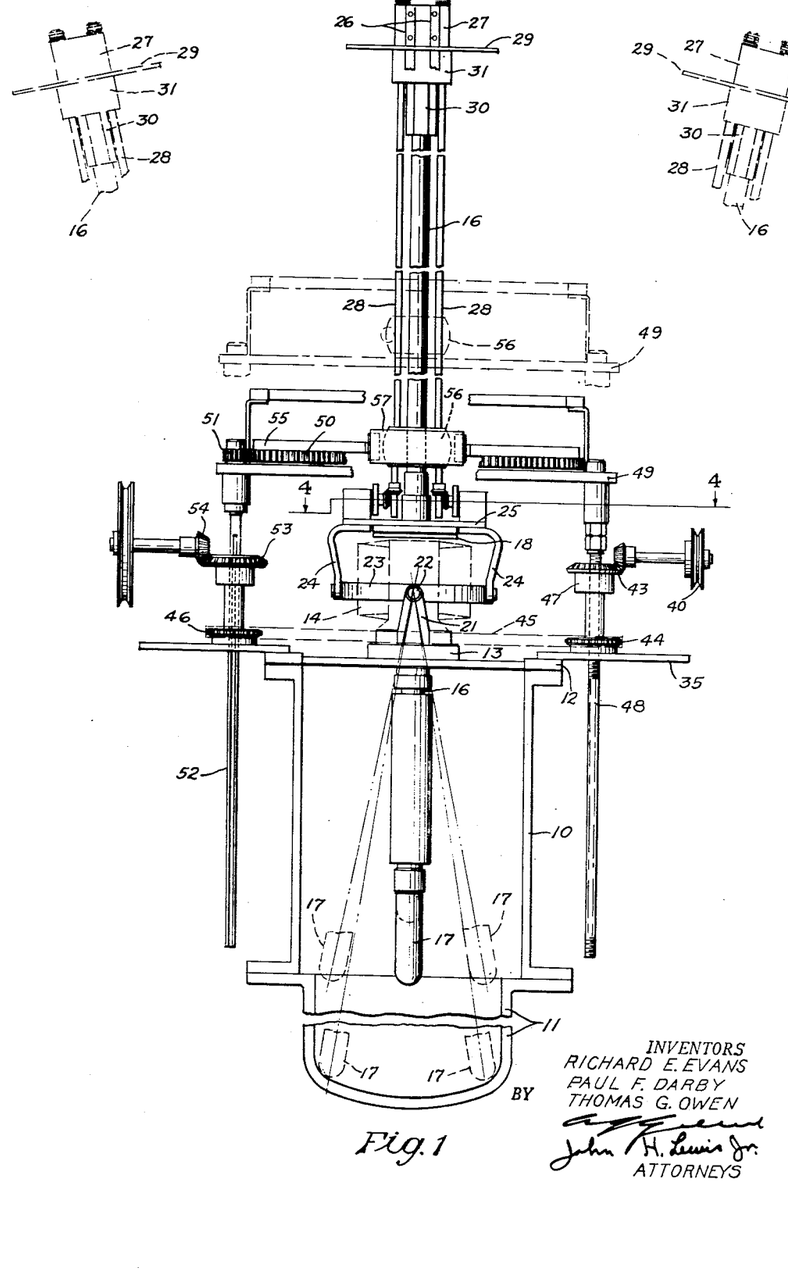
Fig. 1 is a somewhat diagrammatic front elevation of the apparatus as a whole. The electrode appears as vertically disposed in its uppermost position, the electrode stem control plate being in its lowermost position. Other positions of these elements are indicated in broken and dotted lines.

Means are provided for engaging the electrode stem frame at a location above the aforementioned center of movement in gimbal ring 23 and causing the point thus engaged to move in a path of predetermined configuration, thereby causing the electrode to traverse a path of the same configuration and of an amplitude proportional to the spacing of the electrode and the point of engagement of the electrode frame respectively from the aforementioned center. In the simplest form, such paths of movement are circular and the means for securing a circular movement will first be described. Generally stated, this means comprises a frame engaging element which is eccentrically mounted in a revolving plate or disk, the radius of the movement being controlled by the eccentricity of the mounting. The mechanisms for this and other purposes are mounted on a base plate 35 (Figs. 1, 3, and 5) supported on and for transverse adjustment relative to the furnace cover 12 by means of brackets 36 (Fig. 5) secured to the furnace cover and mounting screws 37 received in threaded blocks 38 which are provided with upwardly projecting studs 39 received in apertures in base plate 35. This adjustment enables the centering of the path of movement of the arc with respect to the crucible as the arc shifts on the surface of the unusually large electrode 17. Supported on base 35 is a motor driven pulley 40, which, through suitable gearing and a flexible shaft 41, actuates a set of gears indicated generally at 42, mounted on the electrode frame base plate 25 and serving to rotate the electrode stem feed screws 28 heretofore described. Other connections from pulley 40 actuate a bevel gear 43 which is rigidly connected to a sprocket 44 engaged by a sprocket chain 45, and is provided with an interiorly threaded boss 47 (Fig. 1). Sprocket chain 45 traverses other sprocket wheels 46, rotatably mounted on base plate 35 and having associated therewith threaded hollow bosses 47, and each boss receives a threaded screw 48. A ring-shaped control frame member 49 is supported on thrust bearings at the upper ends of the screws 48 and is thus moved up and down by and with the screws. Supported on ring 49, preferably by means of ball bearings, is an externally toothed ring shaped gear 50 which is rotated by its engagement with a pinion 51 at the top of an arbor 52, which arbor has a spline connection with a bevel gear 53 (Figs. 1, 3, and 4) mounted on base plate 35 and driven by a bevel pinion 54 from a suitable source of power (not shown). Secured to the gear 50 for rotation therewith is a plate 55 which supports the electrode frame controlling device and comprises an irregular aperture adapted to pass the electrode frame therethrough and to accommodate certain parts to be described.

Figure 8:
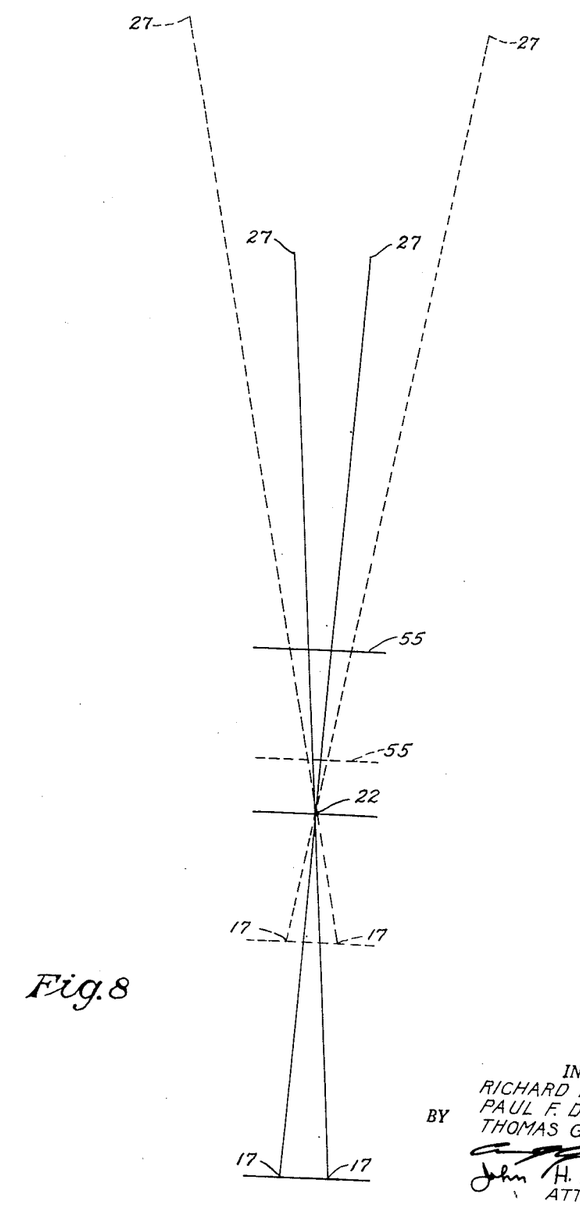
Fig. 8 is a line diagram showing the extreme positions of the electrode and associated parts.

In cross-section (Figs. 2 and 4), the assembly of the four bars 26 which constitute the intermediate portion of the electrode stem frame substantially defines a square. These bars are externally and slidably engaged by the margins of a correspondingly shaped aperture in a control member 56, said margins being recessed to pass the electrode stem moving screws 28. The external surface (Fig. 3) of control member 56 is a diametrical segment of a sphere and is received and supported for universal movement in a correspondingly shaped bearing member 57. Said bearing member 57 comprises a pair of outwardly radially extending arms 58, preferably of rectilinear cross-section, which arms are received and supported for sliding movement in bearing blocks 59 secured to the plate 55. The normal (Fig. 2) position of control member 56 is one which is eccentric to plate 55 and its driving gear 50. Thus, it will be obvious that as gear 50 and plate 55 are rotated, the control member 56 describes a circle of a radius equal to the eccentricity of its mounting and that this circular movement, transmitted to the electrode frame, causes the end of electrode 17 to describe a circle of proportionate radius. It will also be apparent that as the electrode is lifted by the rotation of screws 28, the control member is lowered by the rotation of screws 48, thus maintaining a constant radius of movement of electrode 17 in all vertical positions. The uppermost and lowermost positions of both the electrode and the control member supporting plate 55 are indicated in Figs. 1 and 8.

Figure 2:
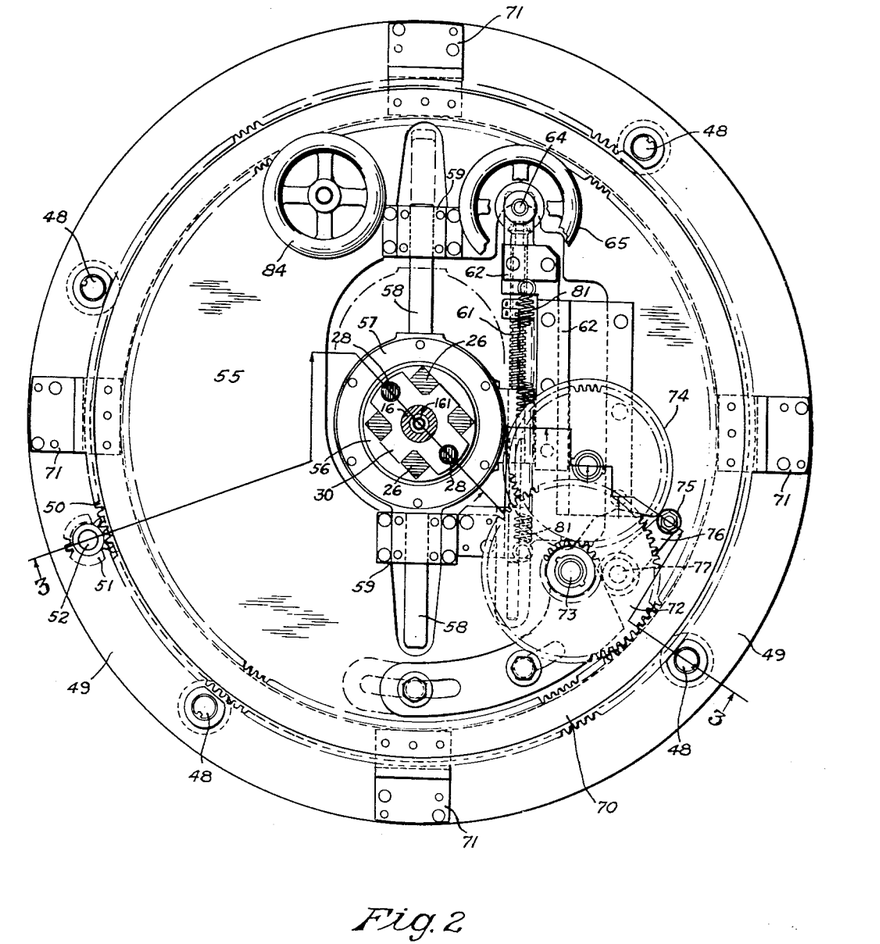
Fig. 2 is a plan view of the apparatus as a whole, the electrode stem frame being sectioned.
Figure 3:
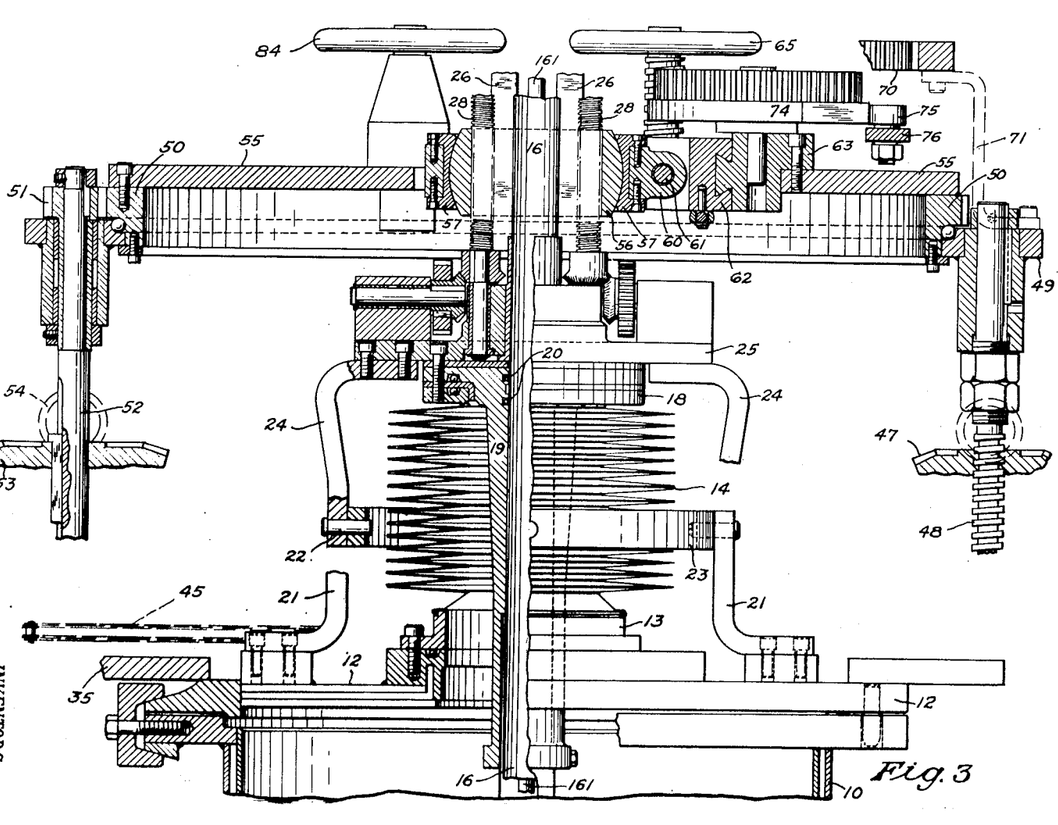
Fig. 3 is a fragmentary sectional elevation substantially on the line 3—3 of Fig. 2.
Figures 4, 5:
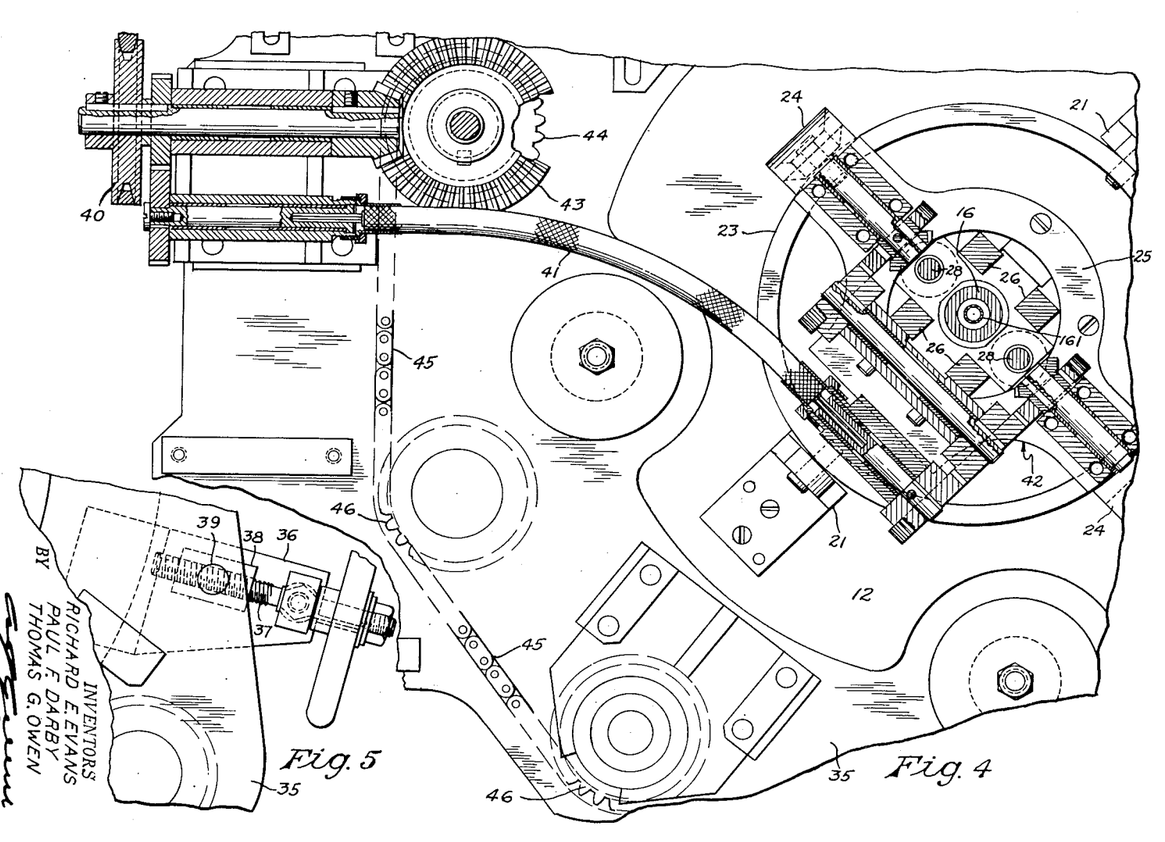
Fig. 4 is a horizontal section substantially on the line 4—4 of Fig. 1.
Fig. 5 is a fragmentary plan which is an extension of Fig. 4, showing the mounting of the base plate on the furnace cover.

It may be desirable to alter the radius of movement of the electrode according to the diameter of the ingot or to the characteristics of the particular metal or alloy being cast. According to the present invention, this is accomplished by altering the eccentricity of the control member 56 with respect to its supporting plate 55. For this purpose, bearing member 57 is provided with a lateral extension 60 in a radial position at 90° to the diametrically disposed arms 58 (Figs. 2 and 3). Said extension 60 is apertured and threaded to receive a screw 61, supported in a bar 62 which has a sliding dovetail connection with a support bar 63 secured to plate 55 adjacent the margin of the aperture therein. Screw 61 is provided with a bevel pinion, meshing with a bevel pinion on a vertically disposed arbor 64, also supported in the bar 62 and having a hand wheel 65 secured to the upper end thereof. It will be apparent that, assuming that bar 62 is fixed on bar 63, rotation of screw 61 by means of hand wheel 65 enables control member 56 to be placed in any desired position of eccentricity with respect to plate 55 and the ingot mold.

The foregoing description relates to means for causing the electrode to move in a circular path. It is within the purview of this invention to cause the electrode to generate a path of any desired configuration. It may, for example, be desirable to cast an ingot of square or rectangular cross-section or, if an ingot of circular cross-section is of large diameter, it may be desirable to cause the electrode to periodically depart from a circular path and perform an excursion of any desired magnitude toward the center of the ingot, with a view to insuring that metal at the center of the ingot is fully melted so that the ingot is substantially homogeneous throughout its cross-section. For these purposes, the present invention contemplates the automatic displacement of member 56 by means of a cam associated with the control plate. The configuration of this cam will vary according to the desired electrode path. As representative of such apparatus, means will be described for causing the electrode to periodically depart from a circular path and perform an excursion toward the ingot center.

Figure 6:
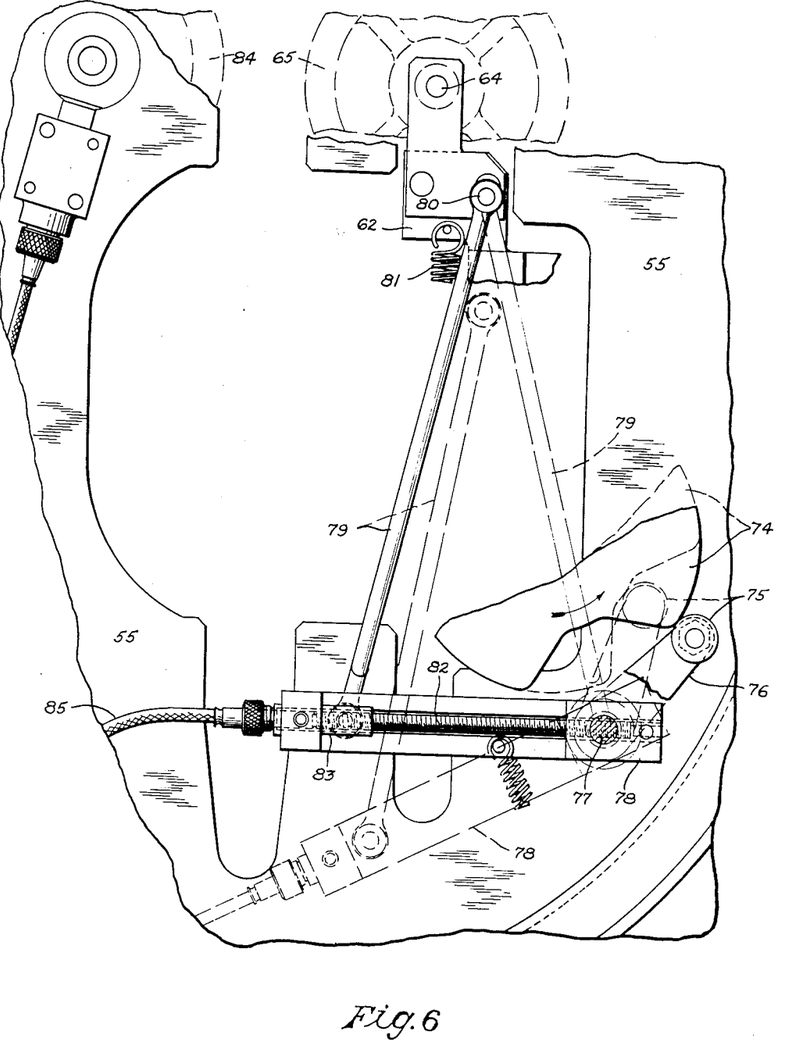
Fig. 6 is a detached plan view of certain elements of the electrode path generator control.

An internally toothed ring gear 70 (Figs. 1, 2, and 3) is supported from the vertically adjustable non-rotating ring plate 49 by suitable means such as brackets 71. Meshing with ring gear 70 is a pinion 72, mounted on an arbor 73 supported in the revolving plate 55. Through suitable intermediate change gears pinion 72 drives a cam 74 (Fig. 6), which actuates a cam follower 75 carried by an arm 76 secured to a vertically disposed arbor 77. Secured to arbor 77 is a lever 78 having adjustably mounted thereon a link 79 having a pivotal connection 80 with the aforementioned dovetail bar 62, which bar, it will be remembered, determines the position of the electrode control member 56. A spring 81 tensioned between dovetail bar 62 and a suitable point on support plate 55 holds the cam follower 75 in engagement with the cam. Thus, when a non-circular part of the cam engages the cam follower, the electrode is caused to perform an excursion toward the center of the ingot, the path of such excursion being determined by the configuration of the cam and the effective length of the lever arm 78. Means are provided for varying the effective length of lever arm 78 as follows:

Rotatably supported upon and extending parallel to lever 78 is a screw 82 received in an apertured and interiorly threaded member 83 to which the driven end of link 79 is pivoted. Screw 82 is rotated from a hand wheel 84 mounted in support plate 55 by means of bevel pinions and a flexible shaft 85. By this means the departure of the electrode from a circular path can be varied from zero to the full radius of the ingot, thus insuring the uniform melting necessary for the production of continuous and homogeneous ingots of a variety of metals and alloys.

It will thus be seen that the complete apparatus, the functioning of the several parts having been described in some detail in conjunction with the description of the mechanism, provides a fully automatic electrode control for the building of ingots of reactive and refractory materials to diameters and lengths of a magnitude not heretofore realized, as well as the manual controls necessary to adjust the automatically operating devices to metals and other substances of varying properties and characteristics.

What is claimed is:

1. Apparatus for the melting of reactive or refractory substances comprising receptacle means for receiving said substances, electrode means insertable into said receptacle means and driving means for said electrode means connected thereto, said driving means comprising means for moving said electrode means in a circular path within said receptacle means and for simultaneously moving said electrode means in a direction transverse to the plane of said circular path and means synchronized with said moving means for intermittently displacing said electrode means from said circular path of movement.

2. Apparatus comprising in combination an electrode, an electrode holding stem, a lateral support for said stem determining a fixed center of gyratory movement thereof, means effectively engaging said stem at a point spaced from said center adapted to move said stem in a gyratory path, means for moving said stem in the direction of its length and with respect to said gyrating means, and means for shifting said stem gyrating means in the direction of said length and with respect to said stem in synchronism with the lengthwise movement of said stem.

3. Apparatus for the melting of metals in a controlled atmosphere comprising a furnace having a cover, an electrode, an electrode stem extending through said cover and supported therein for longitudinal movement and for gyrating movement about a pivot associated with said cover, means for moving said electrode stem in a cone generating path comprising a control member effectively engaging said electrode stem, means for moving said stem in the direction of its length, and means for shifting said control member lengthwise of said stem and with respect to said stem in synchronism with the longitudinal movement of said stem.

4. Apparatus for the melting of metals comprising a receptacle, a movable electrode therein, and means for moving said electrode in a helical path comprising an elongated electrode stem supporting said electrode at one end thereof, means effectively slidably engaging said stem and restraining a shifting point in the length of said stem against transverse movement but permitting gyratory movement of said stem, a control member effectively engaging said stem at a shifting point spaced from the point of engagement of said stem by said restraining means, means for moving said control member in a circular path whose center is displaced from the center of said stem at the point of engagement of said stem by said control member, means for moving said electrode stem in the direction of its length, and means for moving said control member in the direction of the length of said electrode stem and with respect to said stem in synchronism with the longitudinal movement of said electrode.

5. In a furnace for melting refractory materials having a receptacle for said materials the combination with an electrode and an elongated electrode holding stem, of means for moving said electrode in a path within said receptacle and of predetermined configuration in a plane transverse to the length of said stem while shifting said stem longitudinally, said means comprising means in sliding effective engagement with said stem and adapted to restrain the portion of said stem thus engaged against transverse movement, a control member spaced from said restraining means and effectively slidably engaging said stem at a second portion spaced from said first-mentioned portion, a control member supporting plate adapted for rotation about an axis displaced from the center of said second portion, and means for holding said control member on said plate in a position eccentric to the axis of rotation of said plate.

6. Apparatus according to claim 5 comprising means for varying the eccentricity of said control member with respect to the axis of said support plate.

7. Apparatus according to claim 5 comprising manually operable means for varying the eccentricity of said control member with respect to the axis of said support plate, and automatically operating means for periodically displacing said control member radially in said plate and thereafter restoring said control member to the radial position to which it had first been manually set.

8. In a furnace for melting refractory materials having a receptacle for said materials the combination with an electrode and an elongated stem secured thereto of means for enabling said electrode to move in a path within said receptacle and of a predetermined configuration in a plane transverse to the length of said stem while also moving in the direction of the length of said stem, said means comprising an electrode stem supporting frame, mounting means for said frame enabling universal movement thereof, a screw rotatably held in said frame, a member secured to said stem comprising a threaded aperture adapted to receive said screw, means for rotating said screw, an electrode path controlling assembly comprising a control member spaced from said frame mounting means and slidably engaging said frame at a portion thereof spaced longitudinally of said stem from said frame mounting means, a supporting plate, means for revolving said supporting plate about an axis which is different from the longitudinal axis of said stem, means for mounting said control member on said supporting plate in a position eccentric to the axis of rotation of said plate, and means for periodically varying the eccentricity of said mounting with respect to said axis of rotation.

9. The combination with a furnace cover comprising an aperture and an electrode supporting stem passing through said aperture, of electrode stem motion controlling means comprising a base plate mounted and transversely adjustable on said cover, an electrode stem frame, a universal pivot supporting said frame on said base plate, means for moving said stem in said stem frame, a control frame, means for supporting said control frame on and in variable space relation to said base plate, means for varying the space relation of said control frame to said base plate, a control plate rotatably held in said control frame, means for rotating said control plate, a control member adjustably held in said control plate and slidably engaging said electrode stem frame, and means for manually adjusting the radial position of said control member in said control plate.

10. Apparatus according to claim 9 in which said control frame supporting means comprises screws rotatably held in said control frame and apertured and threaded members adapted to receive said screws and rotatably held in said base plate, and means for rotating said threaded members.

11. Apparatus according to claim 9 comprising means for automatically and periodically moving said control member radially on said control plate from the position to which said control member has been adjusted by said manual adjusting means.

12. Apparatus according to claim 11, in which said control member is adjustably held in a bar having a dovetail connection with an element rigid with said control plate, and said automatic radial shifting means is connected to said dovetail bar.

13. Apparatus according to claim 11, in which said automatically operating control member moving means comprises a cam rotatably mounted in said rotating control plate.

14. Apparatus according to claim 13, in which said cam is rotated by the engagement of a pinion with a fixed ring gear associated with said control frame.

15. Apparatus according to claim 14, comprising a connection for varying the movement of said control member by said cam.

16. Apparatus according to claim 15, in which said connection comprises an arm actuated by said cam, a link effectively joining said arm to said control member, and means for adjusting the connection of said link to said arm lengthwise of said arm.

17. Apparatus for the melting of reactive or refractory substances comprising receptacle means for receiving said substances, electrode means insertable into said receptacle means, means for moving said receptacle means and said electrode means toward and away from each other in a first direction and driving means for continuously driving one of said two first-mentioned means in a direction transvese to said first direction and along a path having the shape of a non-circular, closed figure and lying in a plane extending transversely to said first direction.

18. Apparatus for the melting of reactive or refractory substances comprising receptacle means for receiving said substances, electrode means insertable into said receptacle means and driving means for said electrode means connected thereto, said driving means comprising means for moving said electrode means about the center of said receptacle means and means synchronized with said moving means for periodically moving said electrode toward the center of said receptacle means.

19. Apparatus for the melting of reactive or refractory substances comprising a receptacle for receiving and holding said substances, an electrode insertable into said receptacle, a stem connected to said electrode and movable in the direction of the length of said stem, universal mounting means positioned adjacent the mouth of said receptacle and in slidable engagement with said stem, means acting between said mounting means and said stem for moving said stem away from said receptacle and means for moving a portion of said electrode in a predetermined path as said stem is moved away from said receptacle comprising a control frame mounted adjacent said mounting means, driving means mounted on said control frame and connected to said stem at a point thereon spaced from said mounting means for moving said stem in a path of a predetermined configuration, and means connected to said control frame and controlled by said means for moving said stem for adjusting the movement of said stem in said path in predetermined relationship with the movement of said stem away from said receptacle.

20. Apparatus for the melting of reactive or refractory substances comprising a receptacle for receiving and holding said substances, an electrode insertable into said receptacle, a stem connected to said electrode and movable in the direction of the length of said stem, universal mounting means positioned adjacent the mouth of said receptacle and in slidable engagement with said stem, means acting between said mounting means and said stem for moving said stem away from said receptacle and means for moving a portion of said electrode in a predetermined path as said stem is moved away from said receptacle comprising a control frame mounted adjacent said mounting means, driving means mounted on said control frame and connected to said stem at a point thereon spaced from said mounting means for moving said stem in a path of a predetermined configuration, and means connected to said control frame and controlled by said means for moving said stem for moving said control frame toward said receptacle at a predetermined rate.

21. Apparatus for the melting of reactive or refractory substances comprising a receptacle for receiving and holding said substances, an electrode insertable into said receptacle, a stem connected to said electrode and movable in the direction of the length of said stem, universal mounting means positioned adjacent the mouth of said receptacle and in slidable engagement with said stem, a control frame mounted adjacent said mounting means, driving means mounted on said control frame and connected to said stem at a point thereon spaced from said mounting means for moving said stem in a path of a predetermined configuration, means acting between said mounting means and said stem for moving said stem away from said receptacle and means connected to said control frame and controlled by said means for moving said stem for moving said control frame toward said receptacle in predetermined relationship with the movement of said stem away from said receptacle.

22. Apparatus for the melting of reactive or refractory substances comprising a receptacle for receiving and holding said substances, an electrode insertable into said receptacle, a stem connected to said electrode and movable in the direction of the length of said stem a distance substantially equal to the depth of said receptacle, universal mounting means positioned adjacent the mouth of said receptacle and in slidable engagement with said stem, a control frame mounted on the opposite side of said mounting means from said receptacle, driving means mounted on said control frame and connected to said stem at a point thereon spaced from said mounting means for moving said stem in a path of a predetermined configuration, screw means acting between said mounting means and said stem for moving said stem away from said receptacle and screw means connected to said control frame and interconnected with said first-mentioned screw means for moving said control frame toward said receptacle in predetermined relationship with the movement of said stem away from said receptacle.

References Cited in the file of this patent

UNITED STATES PATENTS

| Number | Name | Date |
| --- | --- | --- |
| 586,687 | Heath | July 20, 1897 |
| 1,433,541 | Freedman et al. | Oct. 31, 1922 |
| 1,676,985 | Haughton | July 10, 1928 |
| 1,896,854 | Taylor | Feb. 7, 1933 |
| 2,297,560 | Hopkins | Sept. 29, 1942 |
| 2,527,914 | Cartoux | Oct. 31, 1950 |